(12) United States Patent
Banerjee et al.

(10) Patent No.: US 7,647,409 B2
(45) Date of Patent: Jan. 12, 2010

(54) GRADUAL ONLINE SUBSCRIPTION REMOVAL

(75) Inventors: Dwip N. Banerjee, Austin, TX (US); Rabindranath Dutta, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2024 days.

(21) Appl. No.: 09/894,108

(22) Filed: Jun. 28, 2001

(65) Prior Publication Data
US 2003/0005133 A1 Jan. 2, 2003

(51) Int. Cl.
*G06F 15/16* (2006.01)

(52) U.S. Cl. .................................................... 709/229

(58) Field of Classification Search ......... 709/227–229; 705/1, 34, 50–52
See application file for complete search history.

(56) References Cited

U.S. PATENT DOCUMENTS

| | | | | |
|---|---|---|---|---|
| 5,107,494 A * | 4/1992 | Johnson et al. | ............. | 370/315 |
| 5,519,863 A | 5/1996 | Allen et al. | | |
| 5,752,128 A * | 5/1998 | Yamashita | ................... | 399/80 |
| 5,907,800 A | 5/1999 | Johnson et al. | | |
| 5,956,697 A | 9/1999 | Usui | | |
| 5,988,346 A * | 11/1999 | Tedesco et al. | ............. | 194/217 |
| 6,014,641 A | 1/2000 | Loeb et al. | | |
| 6,021,443 A | 2/2000 | Bracho | | |
| 6,078,866 A | 6/2000 | Buck et al. | | |
| 6,490,271 B1 * | 12/2002 | Erjanne | ..................... | 370/347 |
| 6,493,547 B1 * | 12/2002 | Raith | ........................ | 455/405 |
| 6,598,228 B2 * | 7/2003 | Hejna, Jr. | ..................... | 725/91 |
| 6,662,231 B1 * | 12/2003 | Drosset et al. | ............... | 709/229 |
| 6,766,305 B1 * | 7/2004 | Fucarile et al. | ................ | 705/51 |
| 6,813,718 B2 * | 11/2004 | Colvin | ........................ | 713/202 |
| 2002/0040395 A1 * | 4/2002 | Davis et al. | ................... | 709/224 |
| 2002/0045441 A1 * | 4/2002 | Ralston et al. | ............... | 455/418 |
| 2003/0028548 A1 * | 2/2003 | Nye | ........................... | 707/101 |
| 2003/0212997 A1 * | 11/2003 | Hejna, Jr. | ..................... | 725/88 |
| 2004/0025174 A1 * | 2/2004 | Cerrato | ......................... | 725/9 |

OTHER PUBLICATIONS

Voxware "Voxware Adds New Enhancements to its Award-Winning Internet Telephone Software", PC Newswirte, Sep. 2, 1997, 2 pages.*
Jdate.com "Membership Option and cost", Http://jdate.com, Mar. 30, 2000, 2 pages.*

* cited by examiner

*Primary Examiner*—J Bret Dennison
(74) *Attorney, Agent, or Firm*—Jill Poimboeuf; Jeffrey L. Streets (57) ABSTRACT

Managing subscriber access to online subscription services providing online subscribers or potential new subscribers access to a subscription or trial subscription content at a normal level of service during the subscription period but, after the subscription has expired, providing a decreased level of service during a post-expiration period. The level of service may be decreased incrementally by reducing the content available to a subscriber, downloading the subscription content at a slower than normal rate, delivering certain features in black and white instead of color, deleting sound files, disabling any inter-active features, or any combination of these features. A subscription server manages the various databases and downloads subscription content to the online subscribers. The databases contain information about the subscribers and instructions for the subscription server to follow in granting normal or reduced access to the subscription content.

44 Claims, 7 Drawing Sheets

GRADUAL ONLINE SUBSCRIPTION REMOVAL

BACKGROUND OF THE INVENTION

1. Field of the Invention

The present invention relates to method and system for managing subscriber access to online subscription services.

2. Description of the Related Art

Subscriptions to newspapers, magazines, newsletters, and similar printed media have been available by mail and other delivery systems for many years. With the surge in possession of personal computers, both in the home and in the work place, many providers of traditional printed media subscriptions now offer online subscriptions for their products. Online subscriptions are currently offered not only for the traditional subscription media such as newspapers, popular magazines, and trade journals but also for non-traditional media such as entertainment sites and informational sources including encyclopedias and databases of interest to different business and technology sectors.

When a subscription for traditional printed media expires or is nearing expiration, subscription providers normally mail a reminder to the subscriber, usually with an enticement to encourage renewal, and hope that the subscriber will renew the subscription. When the subscription expires, however, the subscription provider must, to remain profitable, remove the subscriber from the subscription mailing list until the subscriber requests a renewal. Due to the high cost of printing, handling and delivering the printed media, subscription providers usually have no choice but to stop subscription delivery after the subscription period expires. The subscription provider must then rely on mail solicitations, which are often discarded unopened, and other mass media advertising to entice the subscriber to again subscribe to the publication.

For almost all products, a successful marketing campaign is required to attract new customers and retain old ones. A common method of attracting new subscribers used by printed media subscription providers is to offer a free copy or a short trial subscription of the printed media to induce the potential subscriber to acquire a full subscription. However, these offers must also be for only a relatively few copies of the printed media due to the high cost of printing, handling and delivering the printed media.

Online subscription providers deliver the same subscription content to online subscribers without the subscription content first being reduced to a paper format, then mass produced on printing presses, and then processed through a massive delivery system, typically involving warehouses, trucks, rail, and other transportation means, including the mail system. Online subscriptions are delivered over the Internet to online subscribers who connect, with a browser, to a subscription server that downloads the subscription content to the online subscriber. The files downloaded from the subscription server contain all the information, in computer readable format, for the words, pictures, colors of the presentation, sound and presentation layouts required by the online subscriber's computer to display the same subscription content.

Because special editions are so inefficient to produce, it is a practical necessity to adopt an all or nothing approach to delivering printed media subscriptions to a particular subscriber. To vary the content of a printed media subscription requires separate press runs for each separate edition of the printed media. Producing separate editions becomes especially difficult with the problems associated with identifying, shipping and delivering these varying subscription editions to various subscribers.

Therefore, there is a need to entice subscribers of online subscriptions to renew expired subscriptions not constrained by the usual methods used for printed media. There is a further need to develop methods to generate new subscriptions for new subscribers without the constraints of the printed media.

SUMMARY OF THE INVENTION

The present invention provides a method and system for managing online subscriptions so that subscription providers can enhance their opportunities for acquiring a subscriber's renewal request or to generate new subscriptions. The present invention relates to a method for managing subscriber access to an online subscription service. It is an advantage of the present invention that online subscription providers can maintain contact with subscribers who have failed to renew subscriptions after the subscriptions have expired or have failed to purchase a subscription after a trial subscription has expired. The present invention allows online subscription providers to maintain contact by permitting access to the online subscription content but at gradually reduced levels of service.

The present invention provides online subscribers with access to the subscription content at a normal level of service during the subscription period but after the subscription has expired, the online subscription provider may reduce, but not terminate, the level of service during a post-expiration period. Alternatively, the subscription provider may provide a trial online subscription to potential new subscribers at a normal level of service during the trial subscription period but after the trial subscription has expired, reduce, but not terminate, the level of service during a post-trial subscription period.

The level of service may be reduced according to the conditional subscription policy of the online subscription provider. The conditional subscription policy is implemented by the instructions provided to the subscription server and may include decreasing the content available to a subscriber, downloading the subscription content at a slower than normal rate, delivering certain features in black and white instead of color, deleting sound files that are delivered in the full level of service subscription, disabling any inter-active features, such as polling for subscribers' opinions of current issues of the day contained in the subscription content, or any combination of these features.

The level of service may be reduced incrementally based upon one or more factors such as time, access attempts, server availability and subscriber rating. For example, the first time access is granted to a non-renewal subscriber, the level of service may be very close to the normal level of service. The second time access is granted, the level of service can be incrementally decreased, and so on for each time the online subscription is accessed, until finally, the online subscriber is denied access unless a new subscription is purchased or renewed. Factors that may be considered for determining the rate of decrease for the level of service may be the frequency with which a non-renewal subscriber accessed the subscription content during the post-expiration period, the frequency with which the non-renewal subscriber accessed the subscription content during the subscription period, and the duration of the time period for which the non-renewal subscriber had paid for an online subscription. Obviously, an online subscriber that has accessed the subscription content often and for many years is more likely to renew than one who rarely accessed the subscription content. Therefore, the level of service may decrease at a lesser rate for a long-standing customer and at a greater rate for a one-time customer. Also, the allowable access period before service is denied may be greater for a good customer and less for a borderline customer.

Additionally, the online subscription provider may send e-mails to non-renewal subscribers who have not accessed the online subscription for a period of time. The e-mail may contain a hyper-link to the online subscription website and terms for a renewal subscription. The goal for this method would be to entice the non-renewal subscriber to view the subscription content and decide to renew the expired subscription.

The system of the present invention includes a subscription server to manage the various databases and to download subscription content to the online subscribers. It also includes a subscription database containing records of current online subscribers and a non-renewal subscriber database containing non-renewal subscriber records and a post-expiration instruction. The non-renewal records contain non-renewal subscriber identification, a subscription expiration condition, date and frequency of accessing the online subscription after the expiration date, and a period of time the non-renewal subscriber was a paid subscriber. The post-expiration instruction is the instruction to the subscription server for implementing the conditional subscription policy for non-renewal subscribers.

Another database of the system is a potential new subscriber database containing records for potential new subscribers and a potential new subscriber instruction. Potential new subscribers are identified through market research and by capturing the identities of persons accessing the web site for the online subscription. The potential new subscriber records contain the identity of the potential new subscribers and the date and frequency of accessing a trial subscription. The potential new subscriber instruction is the instruction to the server for implementing the conditional subscription policy for potential new subscribers.

BRIEF DESCRIPTION OF THE DRAWINGS

So that the features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are therefore not be considered limiting of its scope, for the invention may admit to other equally effective embodiments.

DETAILED DESCRIPTION OF THE INVENTION

The present invention relates to a method for managing subscriber access to an online subscription service based upon the status of the subscriber's subscription and other relevant factors. According to the present invention, online subscription providers can maintain contact with subscribers who have failed to renew subscriptions after the subscriptions have expired. The present invention allows online subscription providers to maintain contact by permitting access to the online subscription content but at gradually reduced levels of service. Furthermore, the present invention allows for the issuance of subscriptions in various classifications having different levels of performance, such as a student class, standard class, and premium business class.

The online subscriber receives the online subscription content by accessing a web page and requesting access to the subscription content. A subscription server then delivers the subscription content to the online subscriber. Normally, the first page delivered from the subscription server contains highlights of the current issue with hyperlinks to features, stories, and other content. By using a computer mouse, the online subscriber selects the hyperlink having content of interest and the subscription server downloads that content to the online subscriber. According to the present invention, the subscription server may be provided with instructions for forming different editions of the current online subscription content. For example, one edition may disable some of the hyperlinks so the hyperlinks appear on the online subscriber's computer screen but, if the online subscriber selects a disabled hyperlink, the subscription server would not download that feature. Alternatively, if a disabled hyperlink is selected, the subscription server could notify the online subscriber that the selected feature is not available unless the online subscriber, for instance, renews an expired subscription or purchases a new subscription.

Alternatively, the subscription server could alter other service levels for certain identified online subscribers and deliver the subscription content to the identified online subscribers at a lower level of service. In addition to decreasing the content available for an online subscriber, the subscription server could, for example, download the content of the subscription at a slower than normal rate, it could deliver certain features only in black and white format instead of color format, it could delete any sound files that are delivered in the full service subscription edition, it could disable any inter-active features, such as polling for subscribers' opinions of current issues of the day contained in the subscription content, or any combinations of these features. With each of these reduced levels of service, the subscription server could notify the online subscriber that the level of service is decreased and encourage the online subscriber to renew or purchase a subscription to restore the normal level of service.

Figure 1:
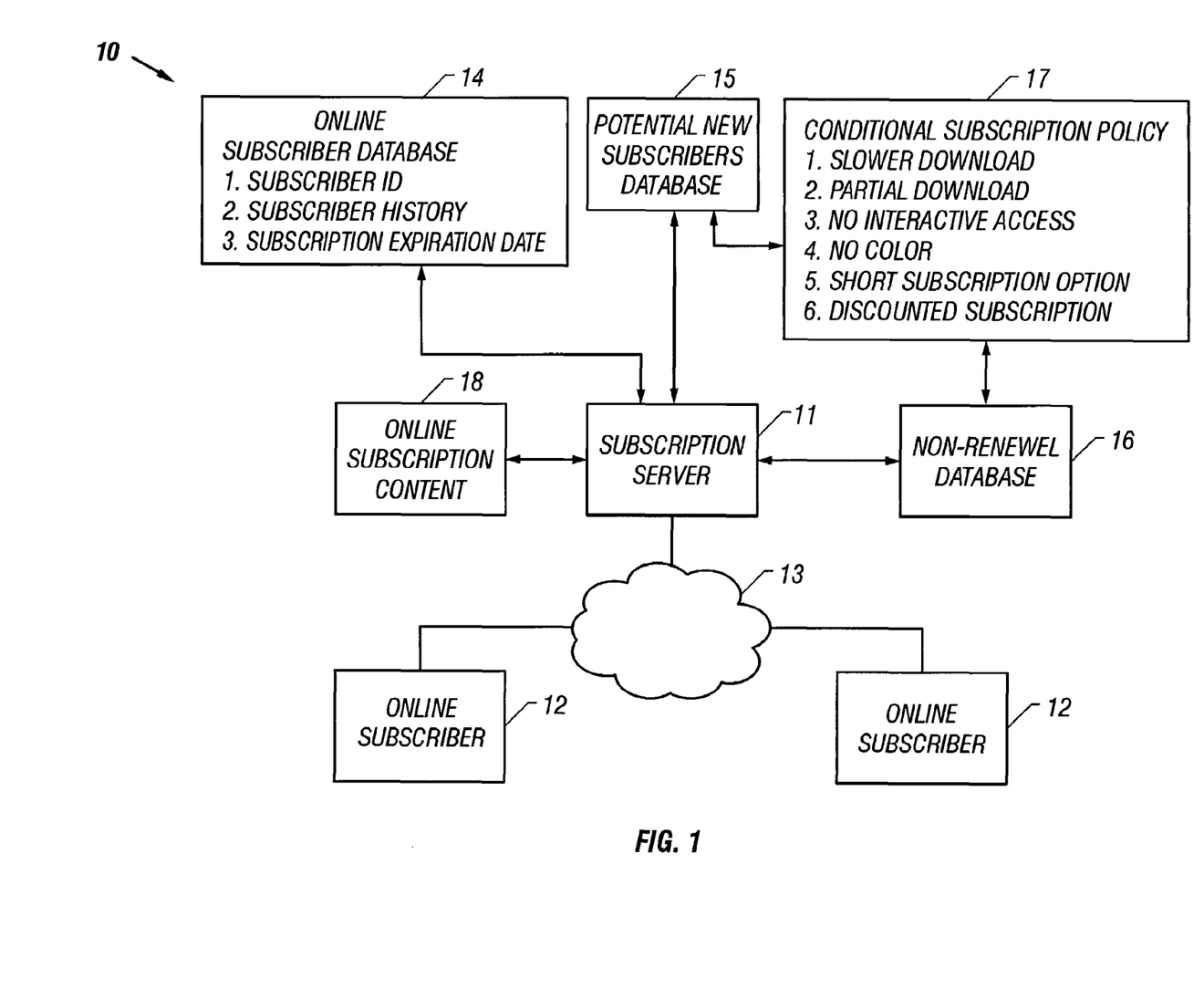
FIG. 1 is a schematic diagram showing the system of the present invention.

FIG. 1 is a schematic diagram showing the online distributed subscription system 10 of the present invention. An online subscriber 12 accesses a communications system or network 13, such as the Internet, to receive the current subscription content 18 of an online subscription. A subscription server 11 communicates with multiple online subscribers 12 through the communications network 13 and downloads the online subscription content 18 to the online subscriber 12. A subscriber database 14 contains records for each online subscriber including the online subscriber's identification, password used to access the subscription content, subscription history of the online subscriber and the subscription expiration date. A non-renewal database 16 contains records for non-renewal subscribers having expired non-renewed subscriptions. These records include the non-renewal subscriber's identification, the non-renewal subscriber's expiration condition, the date and frequency of the non-renewal subscriber's access to the online subscription after the expiration date, and a post-expiration instruction. A potential new subscriber database 15 contains records for trial subscribers. These records include the identity of the potential new subscriber and may include other information such as the date and frequency of access to a trial online subscription given to the potential new subscriber. The post-expiration instruction instructs the subscription server 11 to provide a decreased level of service to certain identified subscribers based upon the conditional subscription policy 17. Optionally, the non-renewal database 16, the potential new subscriber database 15, and the subscriber database 14 may be combined into a single database.

The conditional subscription policy 17 is applied to online subscribers failing to renew their subscriptions, potential new subscribers receiving limited access to a trial subscription, and other subscribers having a special service classification. The conditional subscription policy 17 includes the options that the post-expiration instruction may contain, such as decreasing the amount or level of content available to a non-renewal subscriber, downloading the subscription content at a slower than normal rate, delivering certain features only in black and white format instead of color format, deleting any sound files that are delivered in the full service subscription edition, disabling any inter-active features, such as polling for online subscribers' opinions on the current issues of the day contained in the subscription content, or any combinations of these features.

Optionally, the post-expiration instruction may decrease the level of service in increments. For example, the first time access is granted to a non-renewal subscriber, the level of service delivered may be very close to the normal level of service. The second time access is granted, the level of service can be incrementally decreased by the post-expiration instruction, and so on for each access time until finally, the post-expiration instruction denies access unless the non-renewal subscriber renews the subscription.

The system may also include a potential new subscriber database containing records for potential new subscribers and a potential new subscriber instruction. Potential new subscribers are identified through market research and by capturing the identities of persons accessing the web site for the online subscription. The records for potential new subscribers include the identity of the potential new subscriber and may include other information such as the date and frequency of access to a trial online subscription given to the potential new subscriber. The potential new subscriber instruction instructs the subscription server 11 to provide a decreasing level of service to the potential new subscribers based upon the conditional subscription policy 17. As in the case of the non-renewal instruction, the potential new subscriber instruction may decrease the level of service in increments. For example, the first time access is granted to a potential new subscriber, the level of service delivered will preferably be the normal level of service. The second time access is granted, the level of service is preferably incrementally decreased by the potential new subscriber instruction, and so on for each access time until finally, the potential new subscriber instruction denies access unless the potential new subscriber purchases an online subscription.

The communications network 13 is the medium used to provide communications links between various devices and computers connected together within the distributed online subscription system 10. The communications network 13 may include permanent connections, such as wire or fiber optic cables, or temporary connections made through telephone or wireless communications. Online subscribers and servers may be represented by a variety of computing devices, such as mainframes, personal computers, personal digital assistants (PDAs), smart phones, etc. The distributed data processing system may include additional servers, clients, routers and other devices not shown. In the depicted example, the distributed online subscription system 10 may include the Internet 13 with the distributed online subscription system 10 representing a worldwide collection of networks and gateways that use the TCP/IP suite of protocols to communicate with one another. Of course, the distributed online subscription system 10 may also include a number of different types of networks, such as, for example, an intranet, a local area network (LAN), or a wide area network (WAN).

The present invention can be implemented on a variety of hardware platforms and can be implemented in a variety of software environments. A typical operating system may be used to control program execution within the data processing system. Furthermore, although the preferred embodiment described below includes a "browser" at the online subscriber as the agent which exchanges data in the security protocols with the Web Application Server, the agent at the online subscriber does not have to be a conventional browser, e.g., Netscape Navigator® or Microsoft Internet Explorer®. In order to secure the information transmitted to and from the server, the online subscriber may be capable of Public Key Infrastructure (PKI) technology exchanged in a security protocol such as the Secure Sockets Layer (SSL) version 3.0 and above.

The subscription server 11 includes a conventional server software program such as International Business Machines' Websphere®, for administering the subscription content. The server software includes application programs that enable the server 11 to manage the online subscription databases and execute conditional subscription policies 17 or instructions in response to online subscription access requests from the various online subscribers 12.

Figure 2:
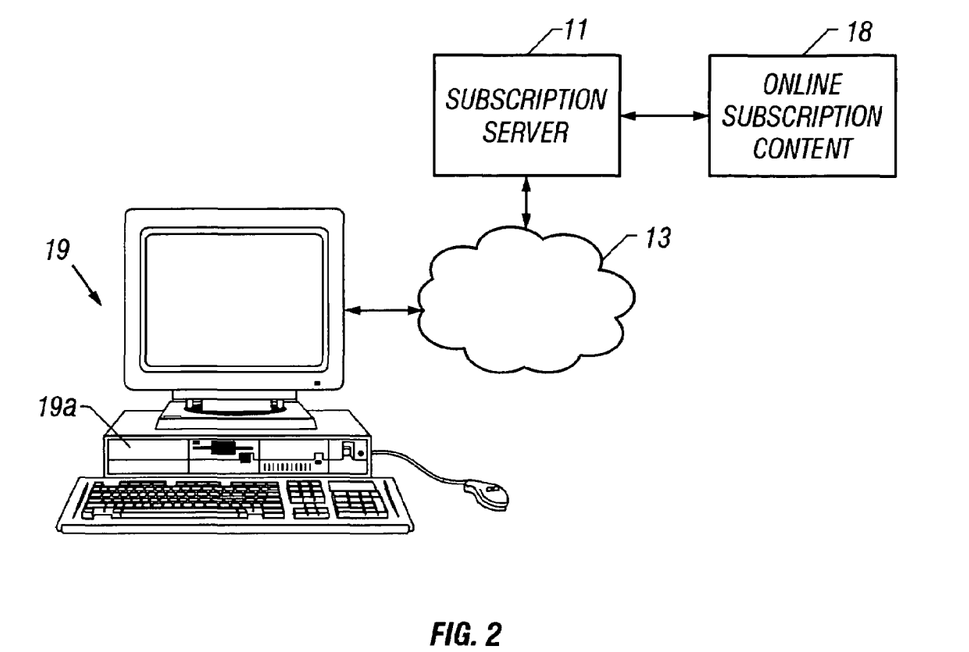
FIG. 2 is a schematic diagram illustrating a subscriber communicating with a subscription server to access and view the online subscription's content.

FIG. 2 illustrates an online subscriber communicating with a subscription server 11 to access and view the online subscription's content 18. As illustrated, the online subscriber at an online subscriber's workstation 19 seeks access over a computer network 13 to the online subscription content 18 located on a subscription server 11 through the online subscriber's web browser 19A. The computer network 13 may be the Internet, an intranet, or other network. The subscription server 11 may be a Web Application Server (WAS), a server application, a servlet process or the like. Optionally, the online subscriber's workstation 19 submits the required information to identify the online subscriber as being authorized to access the online subscription content. Online subscriber information can include data such as a password or a combination of an online subscriber identification and password assigned by the subscription server 11. The subscription server 11 generates a graphical user interface that is displayed by the browser 19A providing the individual options to the online subscriber.

Figure 3:
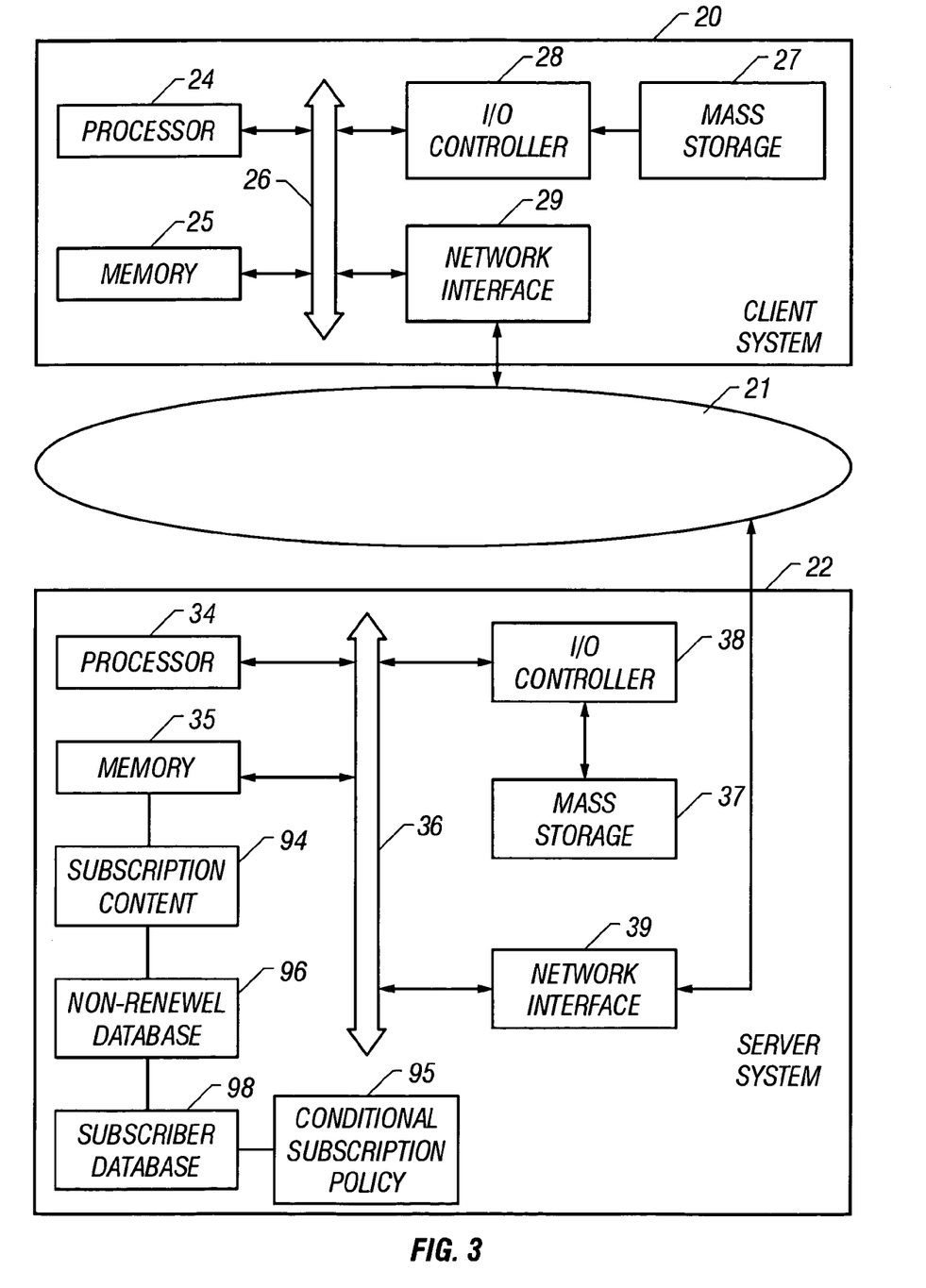
FIG. 3 is a schematic diagram illustrating an example of a subscriber-subscription server system connected though a network.

FIG. 3 depicts an example of an online subscriber-subscription server system connected through the Internet 21. In this example, a subscription server system 22 is connected through the Internet 21 to an online subscriber's system 20. The online subscriber's system 20 includes conventional components such as a processor 24, memory 25 (e.g. RAM), a bus 26 which couples the processor 24 and memory 25, a mass storage device 27 (e.g. a magnetic hard disk or an optical storage disk) coupled to the processor and memory through an I/O controller 28 and a network interface 29, such as a conventional modem. The subscription server system 22 also includes conventional components such as a processor 34, memory 35 (e.g. RAM), a bus 36 which couples the processor 34 and memory 35, a mass storage device 37 (e.g. a magnetic or optical disk) coupled to the processor 34 and memory 35 through an I/O controller 38 and a network interface 39, such as a conventional modem. It will be appreciated from the description below that the present invention may be implemented in software that is stored as executable instructions on a computer readable medium on the online subscriber's and subscription server systems, such as mass storage devices 27 and 37 respectively, or in memories 25 and 35 respectively. The subscription server system 22 is shown having subscription content 94, a conditional subscription policy 95, a non-renewal database 96 and a subscriber database 98 stored in memory 35. The subscription server 22 is thus suitable for processing: (1) subscriber identification, (2) logging date and time of online subscriber's access, (3) determination of subscription expiration, and (4) executing post-expiration instructions. The subscription server 22 also preferably includes electronic mail software for processing e-mail messages and storing e-mail messages transmitted between the subscription server and the various online subscribers or potential online subscribers.

Figure 4:
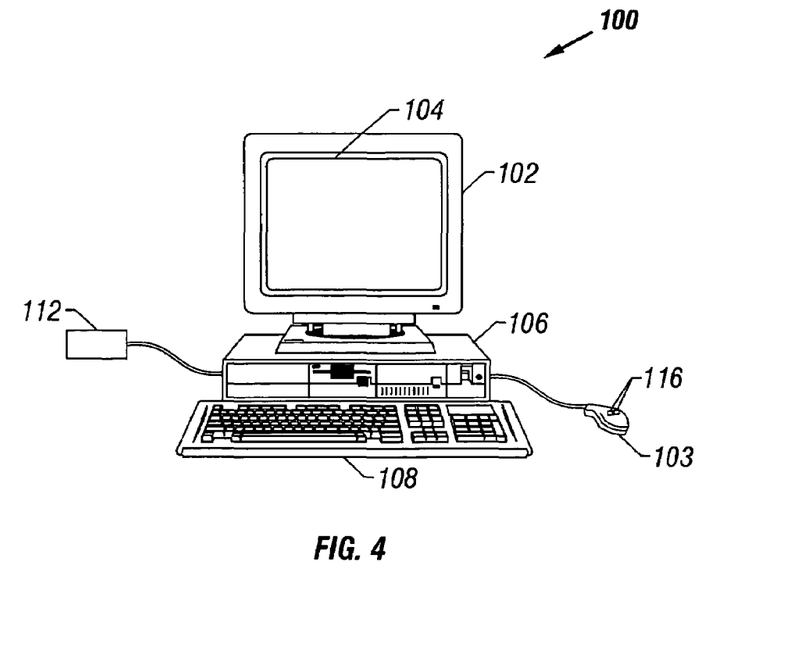
FIG. 4 is an example of a computer system in which the present invention may be implemented.

FIG. 4 shows an online subscriber's computer system 100 capable of running a browser. The computer system 100 includes a display device 102 (such as a monitor), a display screen 104, a cabinet 106 (which encloses components typically found in a computer, such as CPU, RAM, ROM, video card, hard drive, sound card, serial ports, etc.), a keyboard 108, a mouse 103 and a modem 112. The mouse 103 may have one or more buttons, such as buttons 116. The computer requires some type of communication device such as modem 112 that allows computer system 100 to be connected to the Internet. Other possible communication devices include ethernet network cards.

Figure 5:
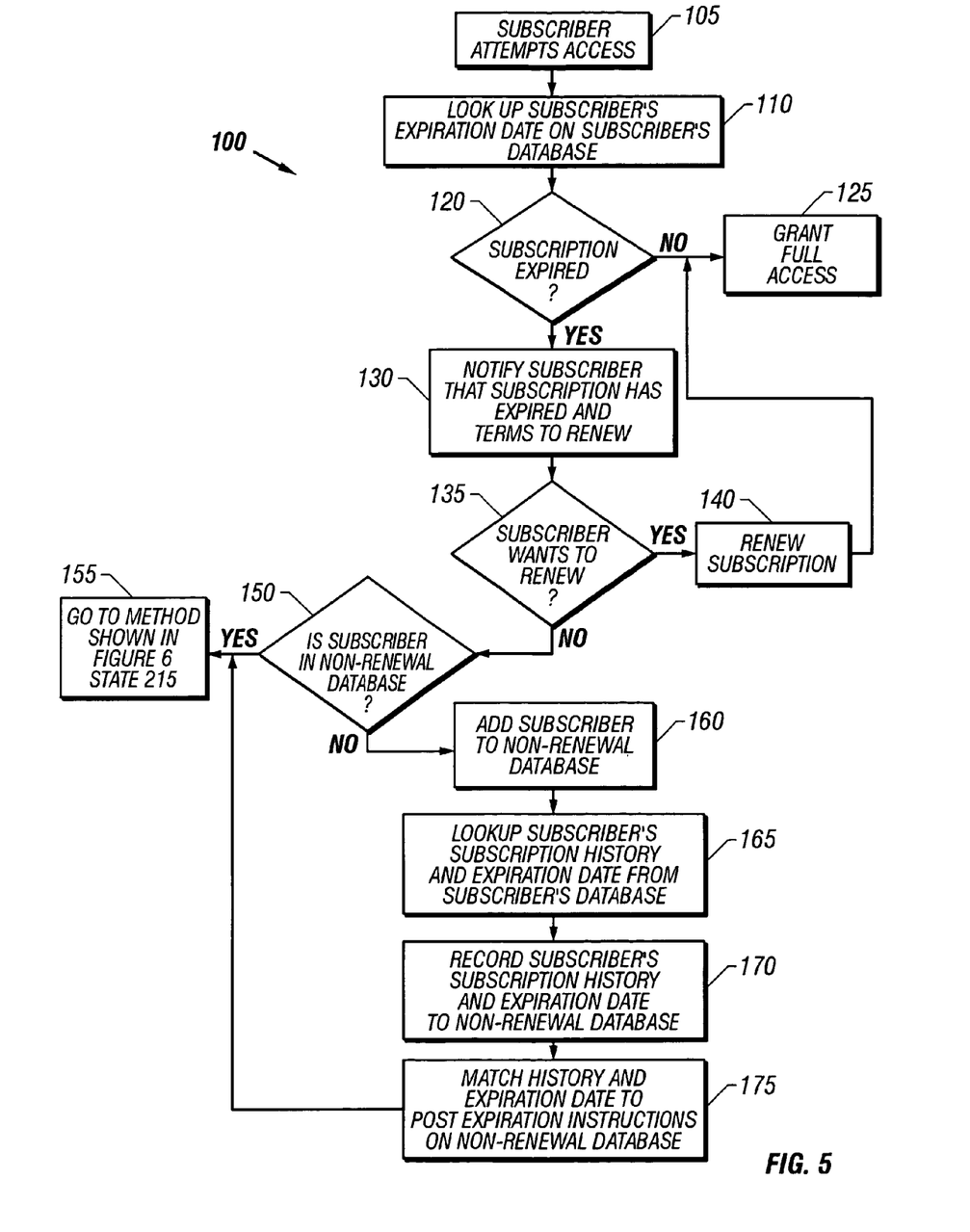
FIG. 5 is a flow chart of a method for determining a subscriber's eligibility for a reduced level of service subscription for a set period of time.

FIG. 5 is a flow chart of a method that may be executed on the system of FIG. 1. The method includes determining a subscriber's eligibility for a reduced level of service for a set period of time. In state 105, an online subscriber attempts to access the online subscription content through the subscription server. In state 110, the subscription server determines the subscription expiration date from the subscriber database record. If, in state 120 the subscription is not expired, then in state 125, the subscription server grants access and downloads the subscription content to the online subscriber. If, in state 120 the subscription is expired, then in state 130, the subscription server notifies the online subscriber of the terms for renewal and that the subscription is expired. If, in state 135 the online subscriber decides to renew, then in state 140, the renewed subscription is entered and in state 125, the online subscriber is granted full access to the subscription content.

If, in state 135 the online subscriber decides not to renew, then in state 150, the subscription server determines whether the online subscriber is recorded in the non-renewal database. If, in state 150, the subscription server determines that the online subscriber is not recorded in the non-renewal database, then in state 160, the subscription server adds the online subscriber to the non-renewal database. In state 165, the subscription server accesses the online subscriber's records from the subscription database and, in state 170, records the online subscriber's subscription history and the corresponding expiration date for the subscription in the non-renewal database. In state 175, the subscription server then matches the online subscribers subscription history and expiration date to the post-expiration instruction. The server then continues, in state 155, with the method shown in FIG. 6. If, in state 150, the subscription server determines that the online subscriber is recorded in the non-renewal database, the server continues, in state 155, with the method shown in FIG. 6. While the method has been disclosed in terms of multiple databases, it is anticipated that the invention may be carried out using a single database or other data structure.

Figure 6:
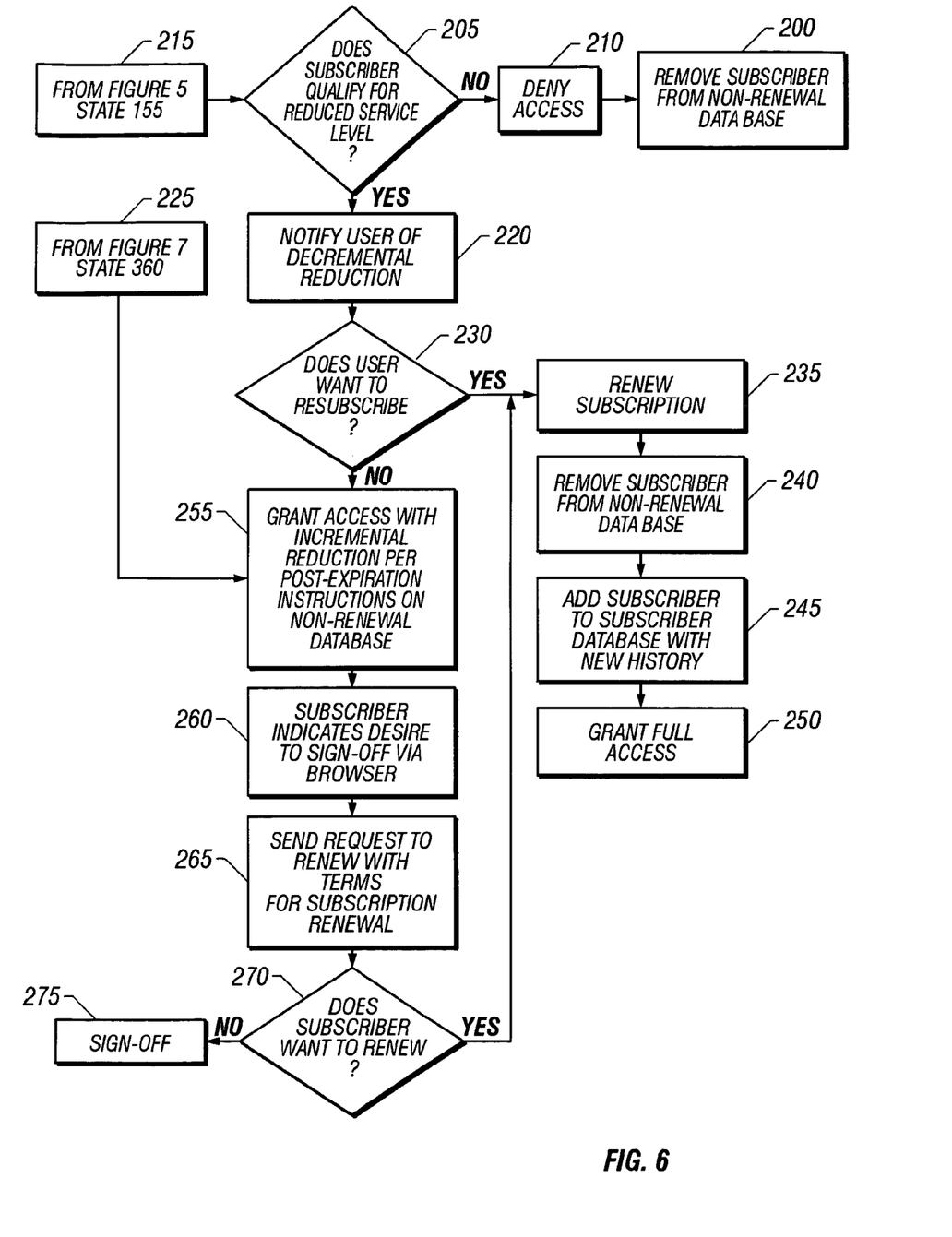
FIG. 6 is a flow chart of a method for delivering a reduced level of service subscription for a set period of time.

FIG. 6 is a flow chart of a method that may be executed on the system of FIG. 1. The method includes delivering an online subscription at a reduced level of service for a set period of time. The goal of this method is to convince online subscribers having expired subscriptions to renew or to convince potential new subscribers to purchase a new subscription by allowing access to the online subscription at a reduced level of service.

In state 215, after determining that a non-renewal subscriber is recorded in the non-renewal database from the method shown in FIG. 5, control is transferred to state 205 where the subscription server determines whether the non-renewal subscriber qualifies for a reduced service level access per the post-expiration instruction contained in the non-renewal database. Factors that may be considered in determining whether a non-renewal subscriber qualifies for a reduced level of service may be, for example, the frequency at which the non-renewal subscriber accessed the subscription content during the post-expiration period, the frequency at which the non-renewal subscriber accessed the subscription content during the subscription period, and the period of time that the non-renewal subscriber had paid for an online subscription. Obviously, an online subscriber that has accessed the subscription content often and for many years is more likely to renew than one who rarely accessed the subscription content. Therefore, the non-renewal instruction may decrease the level of service at a lesser rate for a long-standing customer and at a greater rate for a one-time customer. Also, the allowable period before access to any service level is denied may be greater for a long-standing customer and less for a one-time customer. These are examples of factors that could be considered by the post-expiration instruction.

If, in state 205, the subscription server determines the non-renewal subscriber does not qualify for a reduced service level, in state 210, the subscriber server denies the non-renewal subscriber access to the subscription content and, in state 200, removes the non-subscriber from the non-renewal database. Alternatively, the subscription server could provide a notice of denying access unless the non-renewal subscriber purchases a subscription renewal.

If, in state 205, the subscription server determines that the non-renewal subscriber does qualify for a reduced service level, then in state 220, the non-renewal subscriber is optionally notified of the incremental reduction of service that will be downloaded and, in state 230, will be offered an opportunity to renew the subscription. If, in state 230, the non-renewal subscriber decides to purchase a renewed subscription, in state 235, the subscription is renewed. Then, in state 240, the subscription server removes the online subscriber from the non-renewal database, and in state 245, adds the online subscriber to the subscriber database with an updated history. The online subscriber will then, in state 250, be granted full access to the subscription content.

If, in state 230 the non-renewal subscriber decides not to purchase a renewed subscription, then in state 255, the non-renewal subscriber will be granted access based upon the post-expiration instructions contained in the non-renewal database. In state 225, the method shown in FIG. 7, state 360, will continue to state 255. When, in state 260, the non-renewal subscriber attempts to signoff, in state 265, the subscription server will again query the non-renewal subscriber about purchasing a renewal subscription. If, in state 270 the non-renewal subscriber decides to purchase a renewal subscription, then the same method is followed as described in states 235 through 250. If, in state 270 the non-renewal subscriber decides not to renew the subscription, then in state 275, the subscription server signs off from the connection with the non-renewal subscriber until the non-renewal subscriber again attempts access to the online subscription content.

Figure 7:
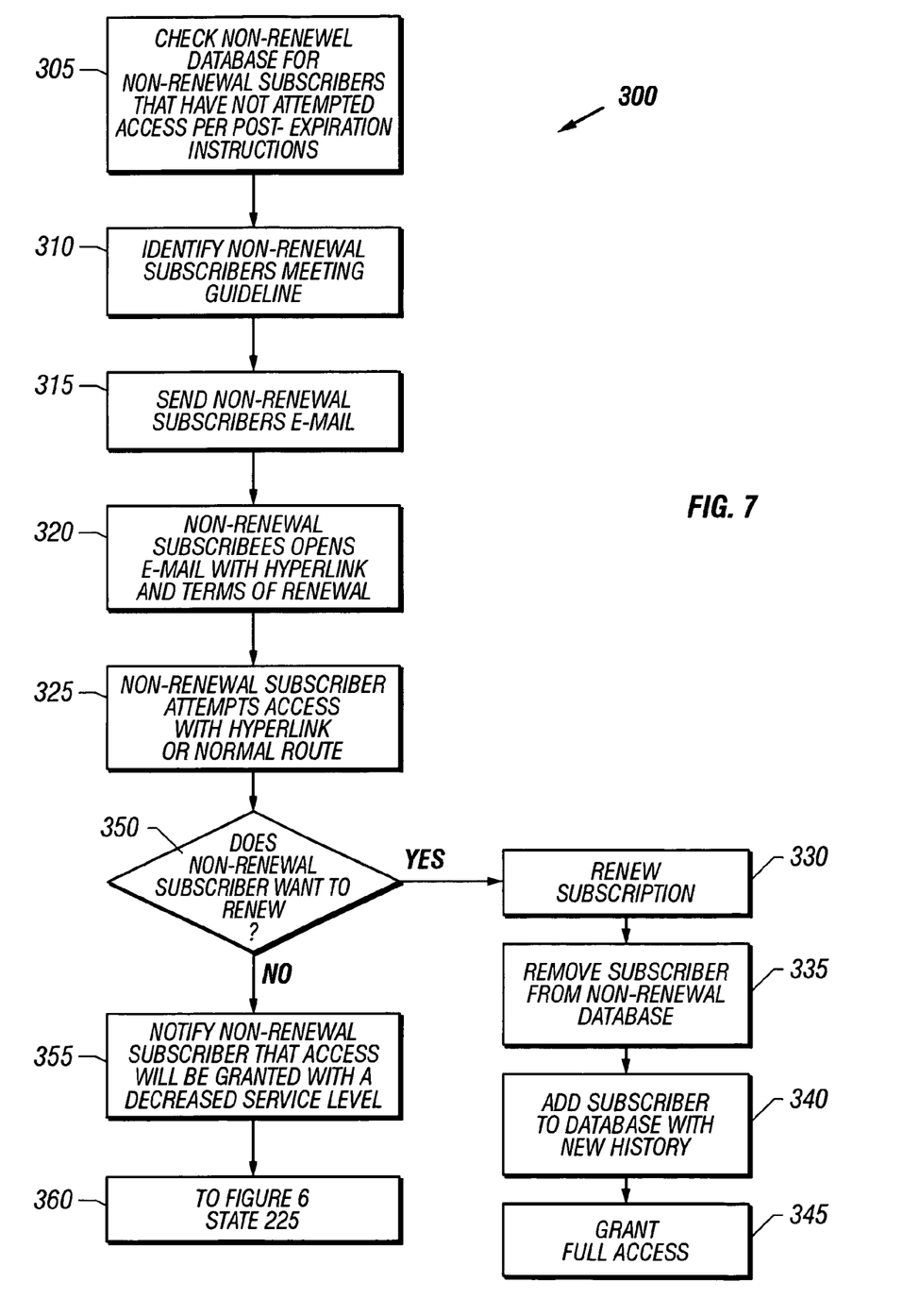
FIG. 7 is a flow chart of a method for using e-mail to contact non-renewal subscribers.

FIG. 7 is a flow chart of a method that may be executed on the system of FIG. 1. The method includes using e-mail to contact non-renewal subscribers as a marketing tool to entice the non-renewal subscribers to purchase a renewal subscription. The goal of this method is to contact non-renewal subscribers who have not attempted to access the online subscription content for a period of time defined in the post-expiration instructions. In state 305, the subscription server searches the non-renewal database for non-renewal subscribers not having attempted access to the subscription content for a set period of time and, in state 310, identifies them. In state 315, the subscription server sends an email to the identified non-renewal subscribers containing a renewal subscription offer and an invitation to access the subscription content. In state 320, the non-renewal subscriber opens the email and in state 325, attempts to access the subscription content. When the non-renewal subscriber accesses the subscription server, in state 350, the subscription server queries whether a renewal subscription is desired. If, in state 350, the non-renewal subscriber decides to purchase a renewal subscription, then in state 330, a renewal subscription is entered. In state 335, the subscription server removes the record for the non-renewal subscriber from the non-renewal database and, in state 340, adds the online subscriber's record to the subscriber database with the new history. Then, in state 345, the online subscriber is granted full access to the subscription content.

If, in state 350 the non-renewal subscriber decides not to renew the subscription, then in state 355, the subscription server notifies the non-renewal subscriber that access is granted at a reduced level of service and in state 360, the server follows the method shown in FIG. 6, state 225 by granting a reduced level of service based upon the post-expiration instructions contained in the non-renewal database.

Figure 8:
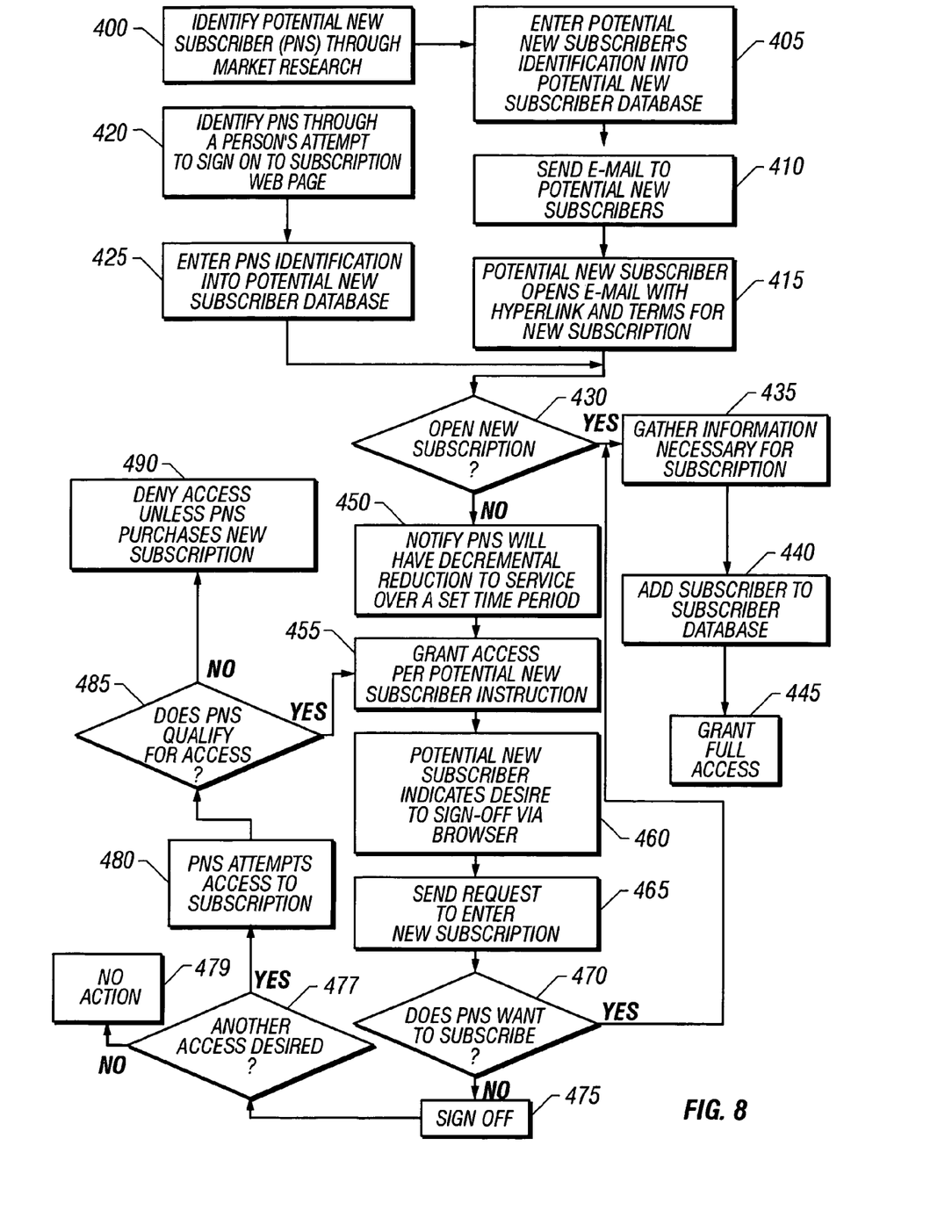
FIG. 8 is a flow chart of a method for granting decremental access to online subscriptions for potential new subscribers.

FIG. 8 is a flow chart of a method that may be executed on the system of FIG. 1. The method includes granting potential new subscribers with access to the subscription content as a marketing tool to encourage potential new subscribers to purchase an online subscription, albeit at a decreasing level of service. In state 400, potential new subscribers are identified through market research. In state 405, the identities of the potential new subscribers are entered into the potential new subscribers database and, in state 410, the server sends an email message inviting the potential new subscribers to access the subscription content. In state 415, the potential new subscriber opens the email and utilizes a hyperlink to access the online server. Alternatively, potential new subscribers are identified, in state 420, as persons who have accessed the online subscription web site and entered, as invited from the web site, as a potential new subscribers. In state 425, these potential new subscribers are entered into the potential new subscribers database. In state 430, the subscription server queries each potential new subscriber as to interest in purchasing an online subscription. If, in state 430, the potential new subscriber decides to purchase a new subscription, then in state 435, the subscription server gathers the information necessary for the new subscription and in state 440, adds the new subscriber to the subscriber database. In state 445, the new subscriber is then granted full access to the subscription content.

If, in state 430 the potential new subscriber decides not to purchase a new subscription, then in state 450, the subscription server notifies the potential new subscriber that access will be granted at a reduced level of service for a set period of time and, in state 455, grants access to the subscription content at the reduced level of service based upon the potential new subscription instructions contained in the potential new subscribers database. When, in state 460, the potential new subscriber is ready to signoff, in state 465, the subscription server again queries the potential new subscriber about purchasing a new subscription. If, in state 470 the potential new subscriber decides to purchase a new subscription, then the same method is followed as described in states 435 through 445. If, in state 470 the potential new subscriber decides not to purchase a subscription, then in state 475, the subscription server signs off from the connection with the potential new subscriber. If, in state 477, the potential new subscriber decides not to attempt access again, then in state 479, there is no action. If, in state 477 another access is desired, then in state 480, the potential new subscriber attempts access to the online subscription content. Then, in state 485, the subscription server determines whether the potential new subscriber is qualified to access the subscription content according to the potential new subscriber instructions. If, in state 485 the potential new subscriber is qualified, then access is granted at a reduced level of service, and the method followed as described above in states 455 through 475. If the potential new subscriber is not qualified to access the subscription content, then in state 490, access is denied until the potential new subscriber decides to purchase a new subscription.

While the foregoing is directed to the preferred embodiment of the present invention, other and further embodiments of the invention may be devised without departing from the basic scope thereof, and the scope thereof is determined by the claims that follow.

We claim:

1. A method to be executed by one or more processors for managing subscriber access to online subscription content comprising:
    (a) providing the subscriber with access to the online subscription service at a first level of service during a subscription period; and
    (b) after expiration of the subscription period, providing the subscriber with access to the online subscription service at a level of service that is lower than the first level of service during a post-expiration period; and then
    (c) terminating subscriber access to the online subscription service after the post-expiration period unless the subscription is renewed.

2. The method of claim 1, wherein the level of service is determined by a service parameter selected from download rate, portion of subscription content accessible, access to member-only features, color formatting, sound and combinations thereof.

3. The method of claim 2, further comprising:
    (c) gradually reducing the level of service during the post-expiration period, and (d) notifying the subscriber of the lower service level and of the service parameters to be reduced.

4. The method of claim 3, wherein the step of gradually reducing the level of service includes incrementally reducing the level of service.

5. The method of claim 4, wherein a rate of reducing the level of service is determined by factors comprising a frequency the subscriber accessed the subscription service during the post-expiration period, a frequency with which the subscriber accessed the subscription service during a subscription period, and a period the subscriber had paid for an online subscription.

6. The method of claim 1, further comprising:
(c) accepting renewal of the subscription; and
(d) after renewal of the subscription, providing the subscriber with access to the online subscription service at the first level of service during a renewed subscription period.

7. The method of claim 6, further comprising:
(e) repeating steps (b) through (d).

8. The method of claim 1, further comprising:
notifying the subscriber of terms for subscription renewal during the post-expiration period.

9. The method of claim 1, wherein the subscriber is a potential new subscriber and wherein the subscription period is a trial subscription period.

10. The method of claim 9, wherein the level of service is determined by a service parameter selected from download rate, portion of subscription content accessible, access to member-only features, color formatting, sound and combinations thereof.

11. The method of claim 10, further comprising:
(c) gradually reducing the level of service during the post-trial subscription expiration period and
(d) notifying the potential new subscriber of the lower service level and of the service parameters to be reduced.

12. The method of claim 11, wherein the step of gradually reducing the level of service includes incrementally reducing the level of service.

13. The method of claim 12, wherein the rate of reducing the level of service is determined by factors comprising a frequency the potential new subscriber accessed the trial subscription during the post-trial subscription expiration period and a frequency the potential new subscriber accessed the trial subscription during a trial subscription period.

14. The method of claim 9, further comprising:
(c) accepting purchase of a new online subscription;
(d) after purchase of the new online subscription, recording the potential new subscriber as a subscriber; and
(e) providing the subscriber with access to the online subscription service at the first level of service during a subscription period.

15. The method of claim 14, further comprising:
(f) repeating steps (b) through (e).

16. The method of claim 9, further comprising:
during the post-trial subscription expiration period, notifying the potential new subscriber that the trial subscription period has expired.

17. The method of claim 9, further comprising:
notifying the potential new subscriber of terms for subscription purchase during the post-trial subscription expiration period.

18. The method of claim 1, further comprising:
maintaining a database of subscriber records, each subscriber record comprising a subscriber identification, a subscription history, and a subscription expiration date;
maintaining a database of non-renewal subscriber records and a post-expiration instruction, each non-renewal subscriber record comprising a non-renewal subscriber identification, a subscription expiration condition, date and frequency of accessing subscription after the subscription expiration date and a period of time the non-renewal subscriber was a paid subscriber, and
upon passing of the expiration condition, executing the post-expiration instruction for the subscriber.

19. The method of claim 18, wherein the post-expiration instruction for the subscriber indicates a service parameter to be reduced, wherein the service parameter is selected from download rate, portion of subscription content accessible, access to member-only features, color formatting, sound and combinations thereof.

20. The method of claim 18, further comprising:
identifying non-renewal subscribers who have not accessed the online subscription over a time period defined in the post-expiration instruction;
notifying the identified non-renewal subscribers with a notification of terms to renew and a hyper-link to the online subscription content;
granting access by the identified non-renewal subscribers to the online subscription service at a reduced level of service
executing the post-expiration instruction during a post-expiration period.

21. The method of claim 9, further comprising:
maintaining a database of potential new subscriber records and a potential new subscriber instruction; wherein the potential new subscriber record comprises an identification of the potential new subscriber, date and frequency of accessing the subscription;
granting access by the identified potential new subscribers to the online subscription; and
executing the potential new subscriber instruction during a potential new subscriber period.

22. The method of claim 21, wherein the potential new subscribers are selected through market research.

23. The method of claim 21, wherein the potential new subscribers are selected through a potential new subscriber accessing a web site for the online subscription.

24. The method of claim 21, wherein the potential new subscriber instruction indicates a service parameter to be reduced, wherein the service parameter is selected from the download rate, portion of content accessible, access to member-only features, color formatting, and combinations thereof.

25. The method of claim 21, further comprising:
terminating the potential new subscriber's access to the online subscription service after the potential new subscriber period.

26. A system for managing subscriber access to an online service comprising:
a. a subscription server;
b. a subscription database; and
c. a non-renewal database; wherein the non-renewal data base comprises non-renewal subscriber records and a post-expiration instruction, each non-renewal subscriber record comprising a non-renewal subscriber identification, a subscription expiration condition, date and frequency of accessing subscription after the subscription expiration date and wherein the post-expiration instruction instructs the subscription server to provide access to the online service by a non-renewal subscriber at a level of service that is decreased from a pre-expiration level of service during a post-expiration period before terminating the access unless the subscription is renewed.

27. The system of claim 26, wherein the post-expiration instruction for the subscriber indicates a service parameter to be reduced, wherein the service parameter is selected from download rate, portion of subscription content accessible, access to member-only features, color formatting, and combinations thereof.

28. The system of claim 26, further comprising a potential new subscriber database, wherein the database comprises potential new subscriber records and a potential new subscriber instruction.

29. The system of claim 28, wherein the potential new subscriber instruction indicates a service parameter to be reduced, wherein the service parameter is selected from download rate, portion of subscription content accessible, access to member-only features, color formatting, and combinations thereof.

30. A computer program product including instructions embodied on a computer readable medium for managing subscriber access to online subscription content, the instructions comprising:
  (a) providing instructions for the subscriber with access to the online subscription service at a first level of service during a subscription period; and
  (b) after expiration of the subscription period, providing instructions for providing the subscriber with access to the online subscription service at a level of service that is lower than the first level of service during a post-expiration period; and
  (c) terminating instruction for terminating subscriber access to the online subscription service after the post-expiration period unless the subscription is renewed.

31. The computer program product of claim 30, wherein the level of service is determined by a service parameter selected from download rate, portion of subscription content accessible, access to member-only features, color formatting, sound and combinations thereof.

32. The computer program product of claim 31, further comprising:
  (c) reducing instructions for gradually reducing the level of service during the post-expiration period, and
  (d) notifying instructions for notifying the subscriber of the lower service level and of the service parameters to be reduced.

33. The computer program product of claim 32, wherein the reducing instructions for gradually reducing the level of service includes instructions for incrementally reducing the level of service.

34. The computer program product of claim 33, wherein a rate of reducing the level of service is determined by factors comprising a frequency the subscriber accessed the subscription service during the post-expiration period, a frequency with which the subscriber accessed the subscription service during a subscription period, and a period the subscriber had paid for an online subscription.

35. The computer program product of claim 30, further comprising:
  (c) accepting instructions for accepting renewal of the subscription; and
  (d) providing instructions for providing the subscriber with access to the online subscription service at the first level of service during a renewed subscription period.

36. The computer program product of claim 35, further comprising:
  (e) repeating steps (b) through (d).

37. The computer program product of claim 30, further comprising:
  notifying instructions for notifying the subscriber during the post-expiration period that the subscription period has expired.

38. The computer program product of claim 30, wherein the subscriber is a potential new subscriber and wherein the subscription period is a trial subscription period.

39. The computer program product of claim 38, wherein the level of service is determined by a service parameter selected from download rate, portion of subscription content accessible, access to member-only features, color formatting, sound and combinations thereof.

40. The computer program product of claim 38, further comprising:
  (c) reducing instructions for gradually reducing the level of service during the post-trial subscription expiration period and
  (d) notifying instructions for notifying the potential new subscriber of the lower service level and of the service parameters to be reduced.

41. The computer program product of claim 38, further comprising:
  terminating instructions for terminating potential new subscriber access to the online trial subscription service after the post-trial subscription expiration period.

42. The computer program product of claim 30, further comprising:
  maintaining instructions for maintaining a database of subscriber records, each subscriber record comprising a subscriber identification, a subscription history, and a subscription expiration date;
  maintaining instructions for maintaining a database of non-renewal subscriber records and a post-expiration instruction, each non-renewal subscriber record comprising a non-renewal subscriber identification, a subscription expiration condition, date and frequency of accessing subscription after the subscription expiration date and a period of time the non-renewal subscriber was a paid subscriber, and
  executing instructions for executing the post-expiration instruction for the subscriber upon passing of the expiration condition.

43. The computer program product of claim 42, wherein the post-expiration instruction for the subscriber indicates a service parameter to be reduced, wherein the service parameter is selected from download rate, portion of subscription content accessible, access to member-only features, color formatting, sound and combinations thereof.

44. A computer program product including instructions embodied on a computer readable medium for managing subscriber access to online subscription content, the instructions comprising:
  (a) providing instructions for providing the subscriber with access to the online subscription service at a first level of service for accessing the online subscription during a subscription period; and
  (b) after expiration of the subscription period, providing instructions for providing the subscriber with access to the online subscription service at a level of service for accessing the online subscription that is lower than the first level of service during a post-expiration period; and
  (c) terminating instructions for terminating subscriber access to the online subscription service after the post-expiration period unless the subscription is renewed.

* * * * *

UNITED STATES PATENT AND TRADEMARK OFFICE
CERTIFICATE OF CORRECTION

PATENT NO.      : 7,647,409 B2                                             Page 1 of 1
APPLICATION NO. : 09/894108
DATED           : January 12, 2010
INVENTOR(S)     : Banerjee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2762 days.

Signed and Sealed this

Sixteenth Day of November, 2010

David J. Kappos
*Director of the United States Patent and Trademark Office*